(12) United States Patent
Yang et al.

(10) Patent No.: US 9,189,075 B2
(45) Date of Patent: Nov. 17, 2015

(54) PORTABLE COMPUTER HAVING POINTING FUNCTIONS AND POINTING SYSTEM

(71) Applicant: PIXART IMAGING INC., Hsin-Chu County (TW)

(72) Inventors: Shu-Sian Yang, Hsin-Chu County (TW); Ming-Tsan Kao, Hsin-Chu County (TW)

(73) Assignee: Pixart Imaging Inc., Hsin-Chu County (TW)

( * ) Notice: Subject to any disclaimer, the term of this patent is extended or adjusted under 35 U.S.C. 154(b) by 33 days.

(21) Appl. No.: 14/087,151

(22) Filed: Nov. 22, 2013

(65) Prior Publication Data

US 2014/0145947 A1    May 29, 2014

(30) Foreign Application Priority Data

Nov. 26, 2012 (TW) .............................. 101144247 A (51) Int. Cl.
*G09G 5/00* (2006.01)
*G06F 3/01* (2006.01)
*G06F 3/03* (2006.01)

(52) U.S. Cl.
CPC .............. *G06F 3/017* (2013.01); *G06F 3/0304* (2013.01)

(58) Field of Classification Search
CPC . G06F 3/0482; G06F 11/3089; G06F 13/102; G06F 17/241; G06F 17/242; G06F 17/30595; G06F 17/30867; G06F 19/363; G06F 1/1613; G06F 1/1618; G06F 1/1622; G06F 1/1624; G06F 1/163; G06F 1/1632; G06F 3/017; G06F 1/1626; G06F 1/1694; G06F 3/0304; G06F 19/3418; G06F 19/345; G06F 19/3462; G06F 19/3487; G06F 2203/04808; G06F 3/011; G06F 3/014; G06F 3/0346; G06F 3/038; G06F 3/0383
USPC .......................... 345/156–167, 169, 173–175
See application file for complete search history.

(56) References Cited

U.S. PATENT DOCUMENTS

| | | | |
|---|---|---|---|
| 2008/0018591 A1* | 1/2008 | Pittel et al. | 345/156 |
| 2011/0102570 A1* | 5/2011 | Wilf et al. | 348/77 |
| 2011/0250929 A1 | 10/2011 | Lin | |
| 2012/0188285 A1* | 7/2012 | Friedlander et al. | 345/660 |
| 2012/0212652 A1* | 8/2012 | Hsu et al. | 348/241 |

FOREIGN PATENT DOCUMENTS

| | | |
|---|---|---|
| TW | 201032092 A | 9/2010 |
| TW | 201135517 A | 10/2011 |
| TW | 201236452 A | 9/2012 |

\* cited by examiner

*Primary Examiner* — Duc Dinh
(74) *Attorney, Agent, or Firm* — Rosenberg, Klein & Lee (57) ABSTRACT

There is provided a pointing system including a first image sensor, a second image sensor and a processing unit. The first image sensor is configured to capture a first image. The processing unit is configured to recognize a predetermined hand posture according to the first image and to identify a click event according to a second image captured by the second image sensor when the predetermined hand posture is recognized.

19 Claims, 5 Drawing Sheets

PORTABLE COMPUTER HAVING POINTING FUNCTIONS AND POINTING SYSTEM

CROSS REFERENCE TO RELATED APPLICATION

This application claims the priority benefit of Taiwan Patent Application Serial Number 101144247, filed on Nov. 26, 2012, the full disclosure of which is incorporated herein by reference.

BACKGROUND

1. Field of the Disclosure

This disclosure generally relates to a pointing system and, more particularly, to a portable computer having pointing functions without employing a touch panel and a pointing system.

2. Description of the Related Art

The biological recognition technology has gradually become mature in present days, wherein the facial recognition technology mainly utilizes an image sensor to capture a face image and utilizes a processing unit to calculate characteristics of the face image which are then compared with the previously saved characteristics so as to recognize an identity represented by the face image.

Using the same algorithm, the processing unit is also able to calculate object characteristics according to a hand posture image captured by the image sensor, and the object characteristics are compared with the previously saved hand posture characteristics so as to recognize whether the hand posture image matches a specific hand posture.

Conventionally, a portable computer having pointing functions implements the pointing function by employing a touch panel. However, employing the touch panel can increase the manufacturing cost of the portable computer.

Accordingly, the present disclosure further provides a portable computer having pointing functions and a pointing system that may implement the touch function by using a built-in webcam of the portable computer in cooperation with an additional infrared image sensor without employing any touch panel.

SUMMARY

The present disclosure provides a portable computer having pointing functions and a pointing system that may implement the pointing function by means of algorithm without employing any touch panel so as to reduce the system cost.

The present disclosure further provides a portable computer having pointing functions and a pointing system that may enter a pointing mode according to a predetermined hand posture and may perform the cursor control and the click operation in the pointing mode.

The present disclosure provides a portable computer including a display screen, a first image sensor, a second image sensor and a processing unit. The display screen may show a cursor. The first image sensor is configured to capture a first image. The second image sensor is configured to capture a second image. The processing unit is configured to recognize a predetermined hand posture according to the first image, activate the second image sensor when the predetermined hand posture is recognized, control the cursor according to a hand posture position of the first image and identify a click event according to the second image.

The present disclosure further provides a pointing system including a first image sensor, a second image sensor and a processing unit. The first image sensor is configured to capture a first image. The second image sensor is configured to capture a second image. The processing unit is configured to recognize a predetermined hand posture according to the first image and identify a click event according to the second image when the predetermined hand posture is recognized.

The present disclosure further provides a portable computer including a plurality of buttons, a first image sensor, a second image sensor and a processing unit. The first image sensor is configured to capture a first image. The second image sensor is configured to capture a second image. The processing unit is configured to recognize a predetermined hand posture according to the first image and identify a click event according to the second image, wherein the portable computer responds to input information of the buttons before the processing unit recognizes the predetermined hand posture and the portable computer responds to input information of the click event after the processing unit recognizes the predetermined hand posture.

In one aspect, the first image sensor may be a webcam or an infrared image sensor, and the second image sensor may be an infrared image sensor.

In one aspect, an infrared light source may operate corresponding to the image capturing of the second image sensor. For example, the infrared light source may emit light alternative in a first brightness value and a second brightness value; the second image sensor may capture a bright image corresponding to the first brightness value and capture a dark image corresponding to the second brightness value; and the processing unit is further configured to calculate a differential image between the bright image and the dark image.

In one aspect, the second image sensor may include a linear image sensor array, e.g. a quasi straight line image sensor array having 750 pixels in length and 1 to 6 pixels in width, so as to generate a linear field of view.

In one aspect, the memory unit may be configured to save information associated with the predetermined hand posture.

In the portable computer and the pointing system according to the embodiment of the present disclosure, the second image sensor may be activated or deactivated before the predetermined hand posture is recognized by the processing unit. When the second image sensor is activated continuously, the processing unit may ignore the image data captured by the second image sensor before the predetermined hand posture is recognized.

In the portable computer and the pointing system according to the embodiment of the present disclosure, when the interference of ambient light does not exist, the light source may illuminate a field of view of the second image sensor with a fixed brightness value, and the processing unit does not calculate the differential image of the second images.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
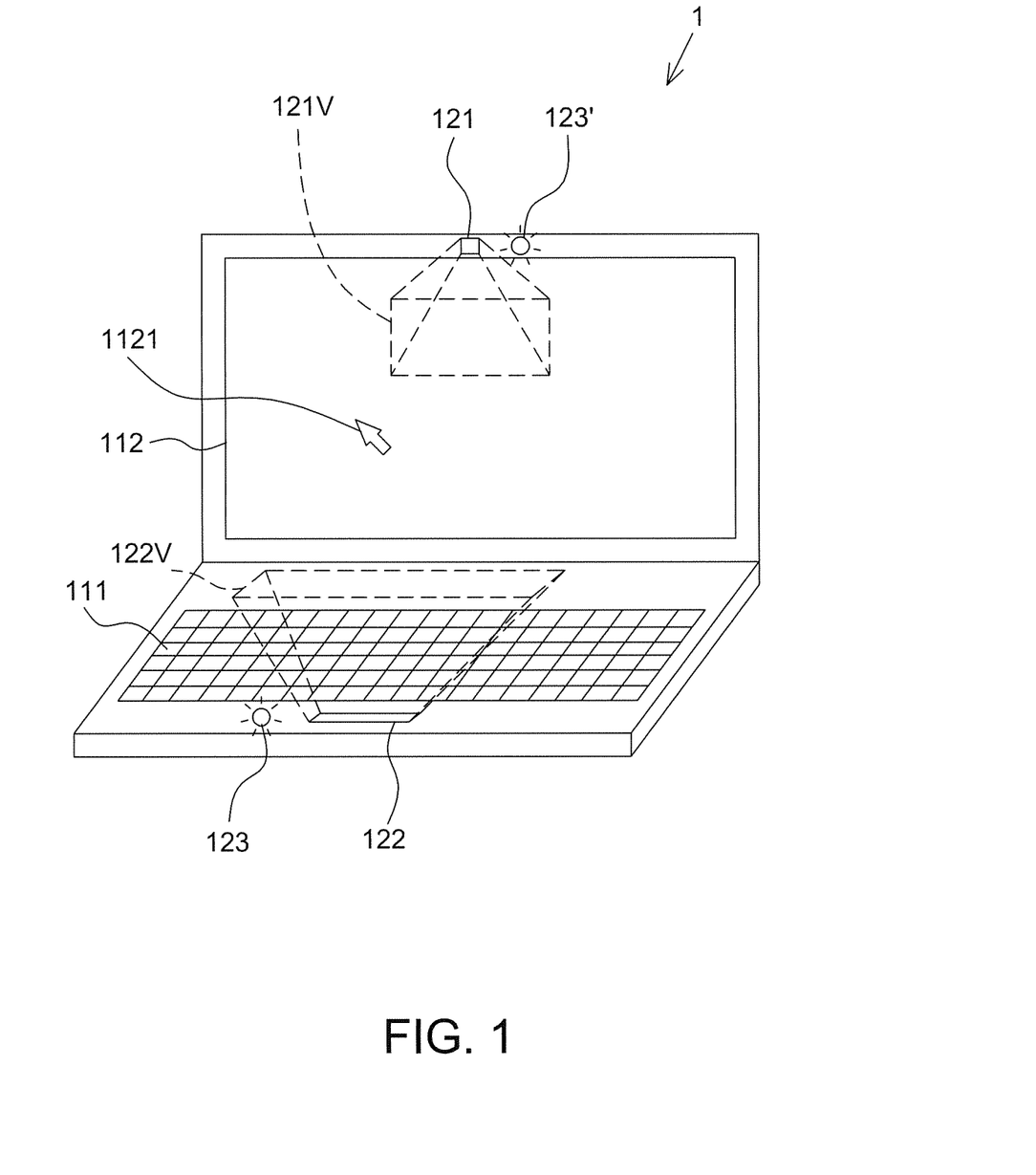
FIG. 1 shows a schematic diagram of the portable computer according to an embodiment of the present disclosure.
Figure 2:
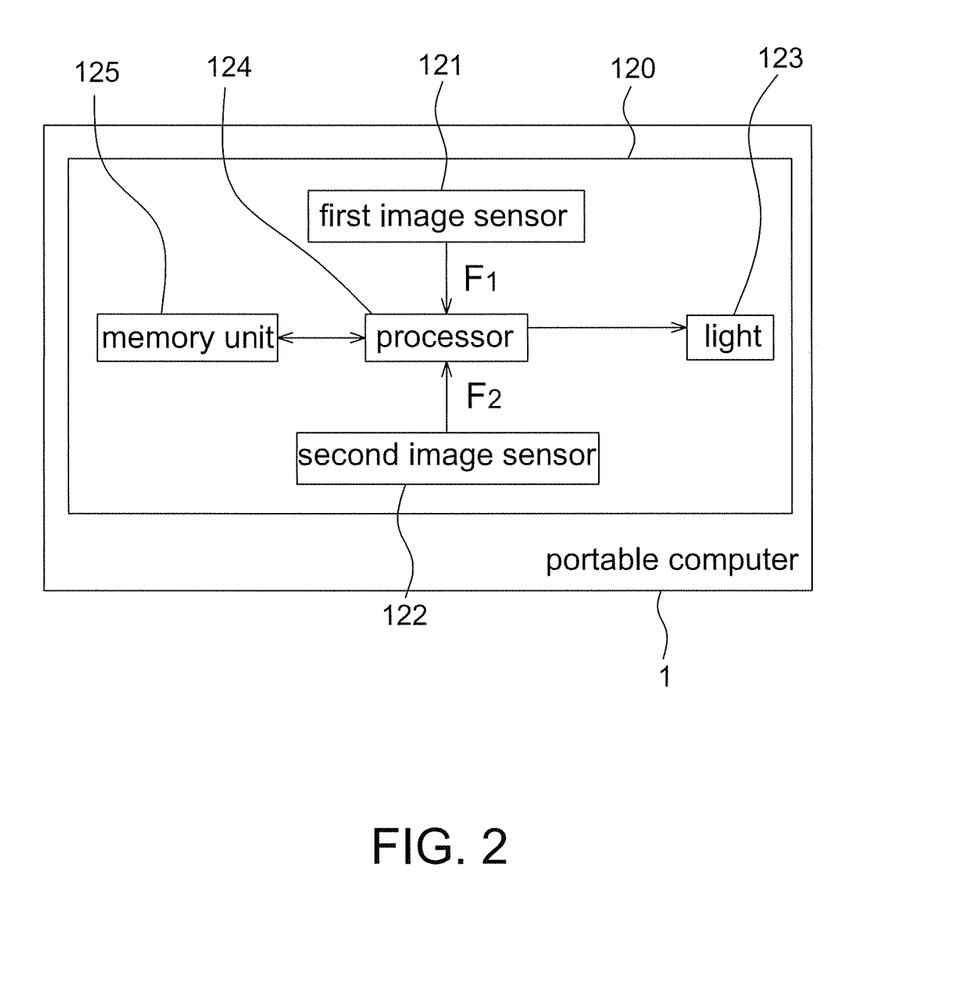
FIG. 2 shows a schematic block diagram of the pointing system according to an embodiment of the present disclosure.

Referring to FIGS. 1 and 2, FIG. 1 shows a schematic diagram of the portable computer having pointing functions 1 according to an embodiment of the present disclosure; and FIG. 2 shows a schematic block diagram of the pointing system 120 according to an embodiment of the present disclosure. The portable computer 1 according to the embodiment of the present disclosure includes a button zone 111, a display screen 112 and a pointing system 120. FIG. 2 shows that the pointing system 120 is integrated with the portable computer 1. The display screen 112 and the button zone 111 may be respectively formed on an upper cover and a bottom cover of the portable computer 1. It should be mentioned that positions of the display screen 112 and the button zone 111 may be arranged according to the operating method of the portable computer 1 without particular limitation.

The button zone 111 has a plurality of buttons that may include buttons generally used in the conventional keyboard without particular limitation. A user may use the buttons as an input interface.

The display screen 112 may include a liquid crystal panel or other suitable panels without particular limitation. The display screen 112 may show a cursor 1121 for being operated by the user. It is appreciated that pictures shown by the display screen 112 are associated with the application program executed by the portable computer 1.

In this embodiment, the pointing system 120 may be configured to replace a touch panel to perform the pointing function and served as another input interface of the portable computer 1. As shown in FIG. 2, the pointing system 120 includes a first image sensor 121, a second image sensor 122, at least one light source 123, a processing unit 124 and a memory unit 125, wherein the processing unit 124 may be the central processing unit (CPU) of the portable computer 1 and the memory unit 125 may be the memory of the portable computer 1 or an independent memory device.

Figure 3:
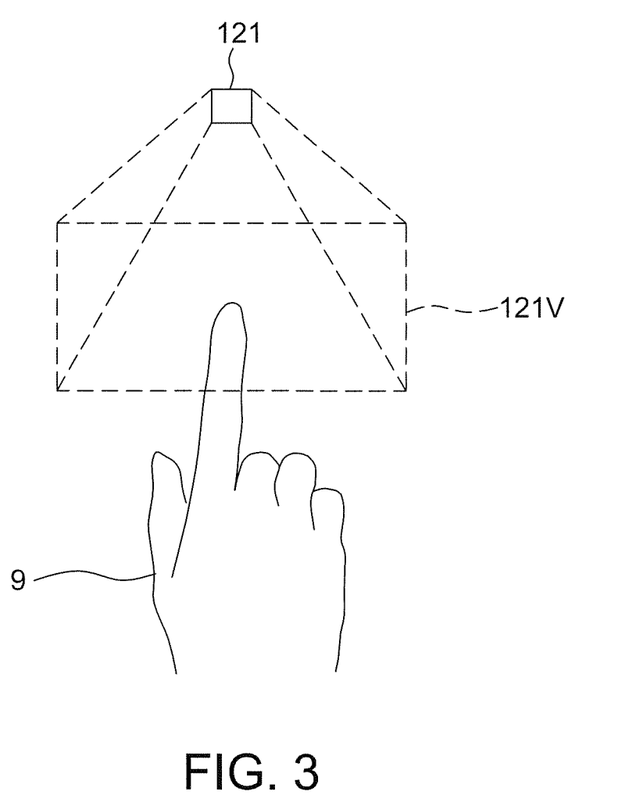
FIG. 3 shows an operational schematic diagram of the first image sensor according to the embodiment of the present disclosure.
Figure 3A:
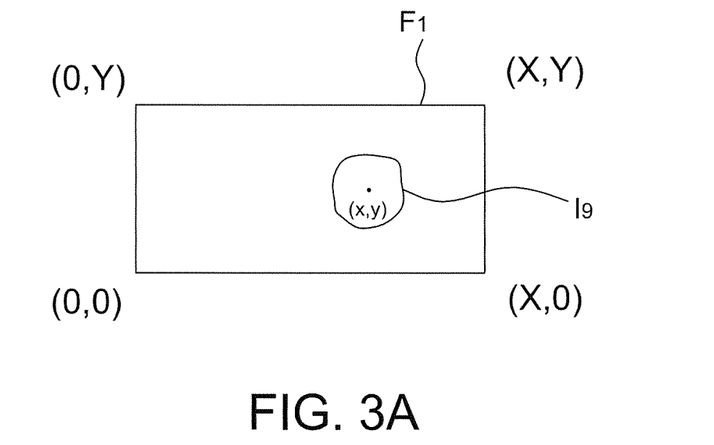
FIG. 3A shows a schematic diagram of a first image capture by the first image sensor of FIG. 3.

The first image sensor 121 may be a visible light image sensor or an infrared image sensor and is configured to successively capture first images $F_1$ at a first sampling frequency, wherein when the first image sensor 121 is an infrared image sensor, the pointing system 120 (or the portable computer 1) may further include an infrared light source 123' configured to illuminate a field of view 121V of the first image sensor 121. When the hand 9 of the user enters the field of view 121V (as shown in FIG. 3), the first image $F_1$ may include an object image $I_9$ (as shown in FIG. 3A). In order not to further increase the element number of the portable computer 1, the first image sensor 121 may use the built-in webcam of the portable computer 1 and the field of view 121V thereof may be directed to the user (or a vertical direction of the display screen 112). Herein, if the webcam is not an infrared image sensor, the light source 123' may not be implemented. In other embodiments, the first image sensor 121 may also be an additional image sensor independent from the built-in webcam without particular limitation. The first image sensor 121 is preferably disposed adjacent to a periphery of the display screen 112.

The second image sensor 122 is preferably an infrared image sensor and configured to successively capture second images $F_2$ at a second sampling frequency, wherein the second sampling frequency may or may not be equal to the first sampling frequency. The second image sensor 122 is preferably disposed adjacent to the button zone 111 and a field of view 122V thereof is preferably directed to an upper direction of the button zone 111, e.g. upward vertically or with a tilted angle. In the embodiment of the present disclosure, as the second image sensor 122 is configured to capture images of the clicking operation made by the user, the second image sensor 122 preferably includes a linear image sensor array configured to capture images having a linear range, wherein the term "linear" herein is referred to that a pixel ratio of a length direction with respect to a width direction of the image sensor array is very large, e.g. 750:1~750:6 so as to form a quasi straight line field of view 122V as shown in FIGS. 4 and 5.

Figure 4:
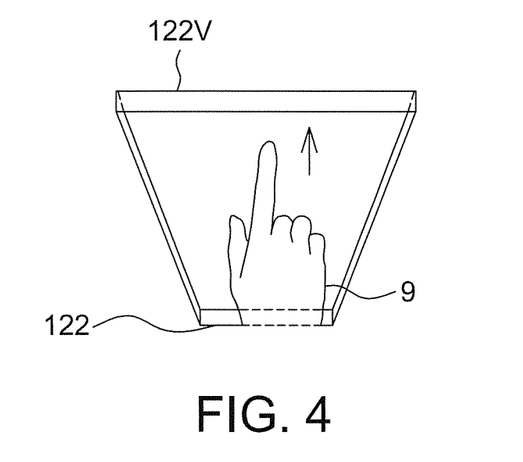
FIG. 4 shows an operational schematic diagram of the second image sensor according to the embodiment of the present disclosure, wherein a finger does not enter a field of view of the second image sensor.
Figure 4A:
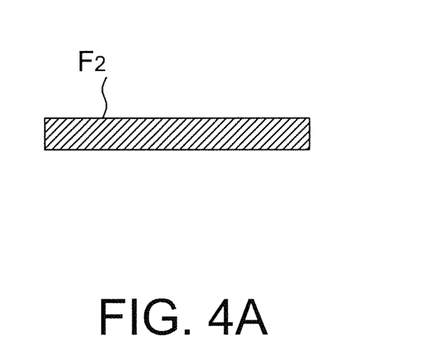
FIG. 4A shows a schematic diagram of a second image captured by the second image sensor of FIG. 4.
Figure 5:
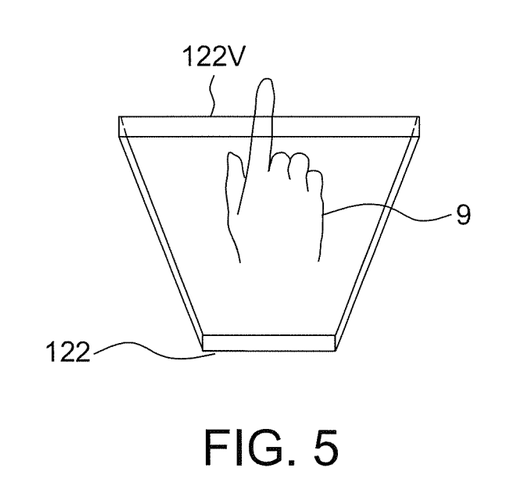
FIG. 5 shows an operational schematic diagram of the second image sensor according to the embodiment of the present disclosure, wherein a finger enters a field of view of the second image sensor.
Figure 5A:
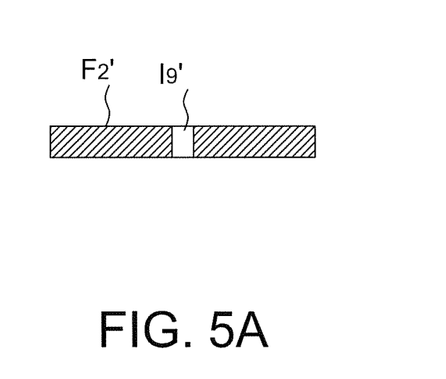
FIG. 5A shows a schematic diagram of a second image captured by the second image sensor of FIG. 5.

Referring to FIG. 4, before the finger 9 of the user enters the field of view 122V, the second image $F_2$ captured by the second image sensor 122 does not contain any object image as shown in FIG. 4A. Referring to FIG. 5, when the finger 9 of the user enters the field of view 122V, the second image captured by the second image sensor 122 contains at least one object image $I_9'$ as shown in FIG. 5A. It is appreciated that although FIG. 5A shows that the second image includes a single object image $I_9'$, it is not to limit the present disclosure. The image number of the object images contained in the second image $F_2'$ may be determined according to the predetermined hand posture, e.g. a plurality of object images may be included.

In order to prevent the image quality of the second image $F_2$ ($F_2'$) captured by the second image sensor 122 from being affected by ambient light, the pointing system 120 (or the portable computer 1) preferably includes a light source 123 configured to illuminate the field of view 122V of the second image sensor 122. In addition, in order not to affect the user when he/she is using the portable computer 1, the light source 123 is preferably an infrared light source and the light source 123 operates corresponding to the image capturing of the second image sensor 122.

Figure 6:
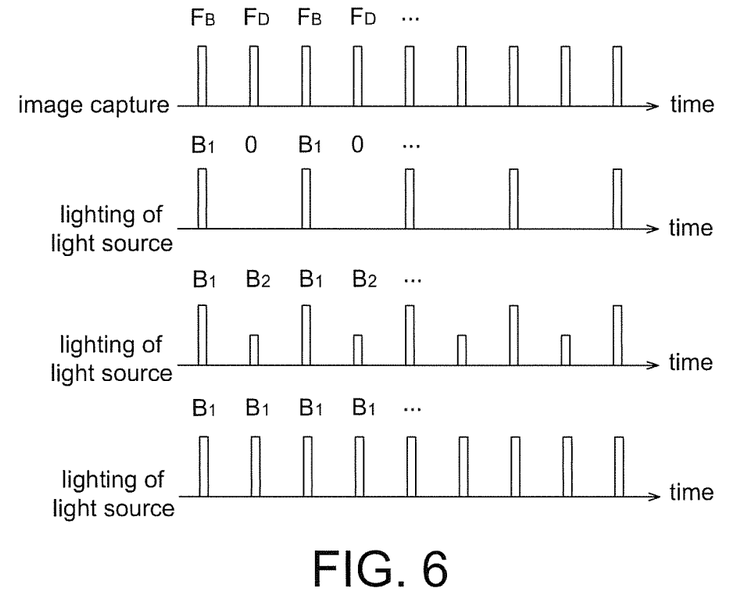
FIG. 6 shows a schematic diagram of the image capturing of the second image sensor and the lighting of the light source according to the embodiment of the present disclosure.

For example referring to FIG. 6, it shows a schematic diagram of the image capturing of the second image sensor 122 and the lighting of the light source 123. The second image sensor 122 may, for example, capture images at a fixed sampling frequency, and the light source 123 may emit light corresponding to the image capturing of the second image sensor 122 alternatively in a first brightness value $B_1$ and a second brightness value $B_2$, wherein the second brightness value $B_2$ may be smaller than the first brightness value $B_1$, and the second brightness value $B_2$ may be larger than or equal to zero brightness. In this manner, the second image sensor 122 may capture a bright image $F_B$ corresponding to the first brightness value $B_1$ and capture a dark image $F_D$ corresponding to the second brightness value $B_2$. It should be mentioned that the bright image $F_B$ herein is referred to an image captured when the light source 123 emits light with higher brightness and the dark image $F_D$ herein is referred to an image captured when the light source 123 emits light with lower brightness or when the light source 123 is turned off. Since the fixed ambient light image is included in both the bright and dark images, the fixed ambient light image is removed and only the object image is left, as shown by the object image $I_9'$ in FIG. 5A, when the dark image $F_D$ is subtracted from the bright image $F_B$.

The processing unit 124 is configured to recognize a predetermined hand posture according to the first image $F_1$, wherein the predetermined hand posture may be stretching forefinger out as shown in FIGS. 3, 4 and 5, but other predetermined hand postures may also be possible (e.g. stretching forefinger and middle finger out, stretching thumb and forefinger out or stretching three fingers out together) without particular limitation as long as the information associated with the predetermined hand posture is previously saved in the memory unit 125 for being compared by the processing unit 124. When the processing unit 124 recognizes the predetermined hand posture, a pointing mode is then entered.

In the pointing mode, the second image sensor 122 is activated. The processing unit 124 may correspondingly control the cursor 1121 according to a hand posture position of the first image $F_1$ and identify a click event according to the second image $F_2$.

For example in FIG. 3A, the processing unit 124 may calculate a two-dimensional coordinate of object (x,y) according to a hand posture position in the first image $F_1$ to be served as a cursor coordinate, and the display screen 112 may show a cursor 1121 according to the cursor coordinate and move the cursor 1121 according to a coordinate variation of the two-dimensional coordinate, wherein the coordinate of object may be a gravity center of a center of the object image $I_9$. The method of calculating an object position according to an object image is well known and will not be described herein.

For example in FIG. 5A, when the second image $F_2$ contains an object image $I_9'$, the processing unit 124 identifies that a click event occurs. As mentioned above, in order to eliminate the ambient light image, the processing unit 124 may further calculate a differential image according to the bright and dark images captured by the second image sensor 122. When the processing unit 124 identifies that the differential image contains an object image (e.g. FIG. 5A may be a differential image herein), it is identified that a click event occurs.

In other words, before the predetermined hand posture is recognized by the processing unit 124 according to the first image $F_1$, the portable computer 1 may operate in a button operating mode, i.e. the portable computer 1 responds to the input information of the buttons; for example showing the button input on the display screen 112. After the processing unit 124 recognizes the predetermined hand posture according to the first image $F_1$, the portable computer 1 may operate in a pointing mode, i.e. the portable computer 1 responds to the input information of the click event and/or the two-dimensional coordinate information; for example executing the function associated with a clicked icon and/or moving the cursor 1121 on the display screen 112.

In one embodiment, when the processing unit 124 has not recognized the predetermined hand posture according to the first image $F_1$, the second image sensor 122 may be deactivated and thus the processing unit 124 only processes the first image $F_1$. In another embodiment, when the processing unit 124 has not recognized the predetermined hand posture according to the first image $F_1$, the second image sensor 122 is activated to capture the second image $F_2$ but the processing unit 124 ignores the second image $F_2$, i.e. the second image $F_2$ is not processed.

It is appreciated that when the second image sensor 122 is not activated, the light source 123 is deactivated. When the second image sensor 122 is continuously activated, the light source 123 may start to operate only when the processing unit 124 has recognized the predetermined hand posture.

In addition, if the interference of ambient light is not a concern, the mechanism of eliminating ambient light may not be implemented; i.e. the light source 123 may illuminate, corresponding to the image capturing of the second image sensor 122, the field of view 122V of the second image sensor 122 at a fixed brightness value and the processing unit 124 does not calculate the differential image.

Figure 7:
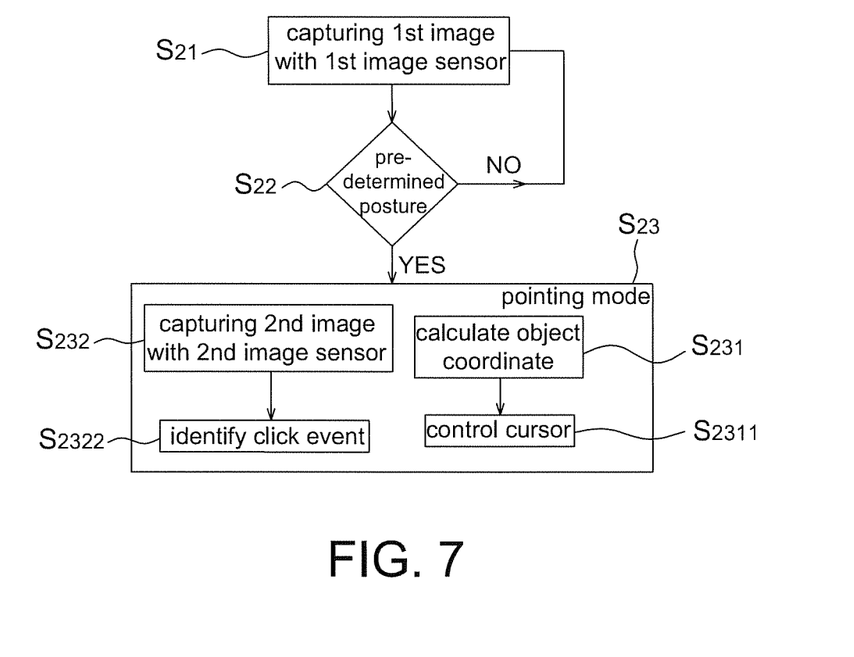
FIG. 7 shows a flow chart of the operating method of the pointing system according to an embodiment of the present disclosure.

Referring to FIG. 7, it shows a flow chart of the operating method of the pointing system according to the embodiment of the present disclosure, which includes the steps of: capturing a first image with a first image sensor (Step $S_{21}$); recognizing a predetermined hand posture (Step $S_{22}$); and capturing a new first image when the predetermined hand posture is not recognized whereas entering a pointing mode when the hand posture is recognized (Step $S_{23}$).

Steps $S_{21}$-$S_{22}$: Before the pointing system according to the embodiment of the present disclosure enters the pointing mode, a trigger mechanism has to be recognized at first. That is, the pointing system utilizes the processing unit 124 to identify whether a first image $F_1$ captured by the first image sensor 121 contains a predetermined hand posture, wherein as mentioned above the information associated with the predetermined hand posture (e.g. hand posture characteristics) is previously saved in the memory unit 125. If the processing unit 124 does not recognize the predetermined hand posture continuously, the Steps $S_{21}$-$S_{22}$ are executed repeatedly.

Steps $S_{23}$: When the pointing mode is entered, the processing unit 124 recognizes two image data and executes two functions. One function is to calculate a two-dimensional coordinate of the object image according to the first image $F_1$ captured by the first image sensor 121, e.g. (x,y) shown in FIG. 3A (Step $S_{231}$). When the pointing system 120 is applied to a portable computer 1 including a display screen 112, the processing unit 124 may perform the cursor control according to the two-dimensional coordinate or a coordinate variation of the two-dimensional coordinate (Step $S_{2311}$). Another function is to identify a click event according to the second image $F_2$ captured by the second image sensor 122; i.e. when an object image $I_9'$ appears in the second image $F_2$, it is able to identified that the click event occurs as shown in FIG. 5A (Steps $S_{232}$-$S_{2322}$). As mentioned above, when the mechanism of eliminating ambient light is included in the pointing mode, the processing unit 124 may calculate the differential image between bright and dark images, and the processing unit 124 identifies that the click event occurs when the object image appears in the differential image. Accordingly, by using the pointing system of the portable computer of this embodiment, the touch function may be implemented without employing any touch panel.

In addition, the click event mentioned in the embodiment of the present disclosure may be a single click or a multi click. For example, the processing unit 124 may count a click number within a predetermined time interval so as to identify whether the single click or multi click is performed by the user so as to achieve the object of instinctive operation.

As mentioned above, the conventional portable computer can perform the pointing function only by employing a touch panel. Therefore, the present disclosure further provides a portable computer (FIG. 1) and a pointing system (FIG. 2) that may implement the touch function by means of algorithm such that a touch panel is no longer necessary and the total cost is reduced.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A portable computer, comprising:
a display screen showing a cursor;
a first image sensor disposed on a first plane on which the display screen locates and configured to capture a first image toward a first direction along a front of the display screen;
a second image sensor disposed on a second plane, and configured to capture a second image in a field of view thereof and toward a second direction, wherein the second plane is not parallel to the first plane, and the second direction is different from the first direction; and
a processing unit configured to recognize a predetermined hand posture according to the first image, activate the second image sensor when the predetermined hand posture is recognized, control the cursor according to a hand posture position of the first image and identify a click event of an object transversely crossing the field of view of the second image sensor according to the second image.

2. The portable computer as claimed in claim 1, wherein the first image sensor is a webcam and the second image sensor is an infrared image sensor.

3. The portable computer as claimed in claim 2, further comprising an infrared light source operating corresponding to image capturing of the second image sensor.

4. The portable computer as claimed in claim 3, wherein the infrared light source emits light alternative in a first brightness value and a second brightness value, the second image sensor captures a bright image corresponding to the first brightness value and captures a dark image corresponding to the second brightness value, and the processing unit is further configured to calculate a differential image between the bright image and the dark image.

5. The portable computer as claimed in claim 1, further comprising a button zone, wherein the first image sensor is disposed adjacent to a periphery of the display screen and the second image sensor is disposed adjacent to the button zone.

6. A pointing system, comprising:
a first image sensor disposed on a first plane and configured to capture a first image toward a first direction;
a second image sensor disposed on a second plane, and configured to capture a second image in a field of view thereof and toward a second direction, wherein the second plane is not parallel to the first plane, and the second direction is different from the first direction; and
a processing unit configured to recognize a predetermined hand posture according to the first image and identify a click event of an object transversely crossing the field of view of the second image sensor according to the second image when the predetermined hand posture is recognized.

7. The pointing system as claimed in claim 6, further comprising an infrared light source operating corresponding to image capturing of the second image sensor.

8. The pointing system as claimed in claim 7, wherein the infrared light source emits light alternative in a first brightness value and a second brightness value, the second image sensor captures a bright image corresponding to the first brightness value and captures a dark image corresponding to the second brightness value, and the processing unit is further configured to calculate a differential image between the bright image and the dark image.

9. The pointing system as claimed in claim 8, wherein the processing unit identifies that the click event occurs when recognizing an object image in the differential image.

10. The pointing system as claimed in claim 6, wherein the second image sensor comprises a linear image sensor array.

11. The pointing system as claimed in claim 6, wherein the first image sensor is a visible light image sensor or an infrared image sensor.

12. The pointing system as claimed in claim 6, wherein the processing unit is further configured to calculate a two-dimensional coordinate according to the first image.

13. A portable computer, comprising:
a plurality of buttons;
a first image sensor disposed on a first plane and configured to capture a first image toward a first direction;
a second image sensor disposed on a second plane on which the plurality of buttons locate, and configured to capture a second image in a field of view thereof and toward a second direction along a front of the plurality of buttons, wherein the second plane is not parallel to the first plane, and the second direction is different from the first direction; and
a processing unit configured to recognize a predetermined hand posture according to the first image and identify a click event of an object transversely crossing the field of view of the second image sensor according to the second image,
wherein the portable computer responds to input information of the buttons before the processing unit recognizes the predetermined hand posture and the portable computer responds to input information of the click event after the processing unit recognizes the predetermined hand posture.

14. The portable computer as claimed in claim 13, wherein the first image sensor is a webcam and the second image sensor is an infrared image sensor.

15. The portable computer as claimed in claim 14, further comprising an infrared light source operating corresponding to image capturing of the second image sensor.

16. The portable computer as claimed in claim 15, wherein the infrared light source emits light alternative in a first brightness value and a second brightness value, the second image sensor captures a bright image corresponding to the first brightness value and captures a dark image corresponding to the second brightness value, and the processing unit is further configured to calculate a differential image between the bright image and the dark image.

17. The portable computer as claimed in claim 13, wherein the processing unit is further configured to calculate a cursor coordinate according to the first image after recognizing the predetermined hand posture.

18. The portable computer as claimed in claim 13, further comprising a memory unit configured to save information associated with the predetermined hand posture.

19. The portable computer as claimed in claim 13, wherein the second image sensor is activated or deactivated before the processing unit recognizes the predetermined hand posture.

* * * * *